(12) United States Patent
Jauss et al.

(10) Patent No.: US 12,181,101 B2
(45) Date of Patent: Dec. 31, 2024

(54) LUBRICANT AND COOLANT SYSTEM WITH A RESERVOIR AND TWO SUMPS

(71) Applicant: MAHLE International GmbH, Stuttgart (DE)

(72) Inventors: Stefan Jauss, Donzdorf (DE); Hans-Martin Ruppert, Ostfildren (DE); Josef Rutha, Rudersberg (DE); Kai-Torsten Schmiedl, Altdorf (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/099,909

(22) Filed: Jan. 20, 2023

(65) Prior Publication Data
US 2023/0279993 A1 Sep. 7, 2023

(30) Foreign Application Priority Data
Jan. 21, 2022 (DE) ...................... 10 2022 200 696.8

(51) Int. Cl.
*F16N 39/02* (2006.01)
*F16N 7/40* (2006.01)

(52) U.S. Cl.
CPC ............... *F16N 39/02* (2013.01); *F16N 7/40* (2013.01)

(58) Field of Classification Search
CPC ........ F16N 7/40; F16N 39/02; F16H 57/0417; F16H 57/0424; F16H 57/045; F01M 5/00;
(Continued)

(56) References Cited

U.S. PATENT DOCUMENTS 5,485,895 A * 1/1996 Peterson .............. C10M 177/00
184/104.1
8,336,515 B2 12/2012 Jainek
(Continued)

FOREIGN PATENT DOCUMENTS

DE 202008010864 U1 1/2010
DE 102008060224 A1 6/2010
(Continued)

OTHER PUBLICATIONS

English abstract for DE-10 2008 060 224.
(Continued)

*Primary Examiner* — Minh Truong
(74) *Attorney, Agent, or Firm* — Fishman Stewart PLLC

(57) ABSTRACT

A system for a motor vehicle may include a reservoir, a plurality of lubricant paths extending through the reservoir, a plurality of coolant paths extending through the reservoir, a plurality of delivery devices attached to the reservoir, and a plurality of coolers attached to the reservoir. The reservoir may include two sumps for lubricant. The reservoir may include (i) a plurality of reservoir lubricant inlet connections and a plurality of reservoir lubricant outlet connections through which the lubricant paths extend, (ii) a plurality of reservoir coolant inlet connections and a plurality of reservoir coolant outlet connections through which the coolant paths extend, (iii) a plurality of fluidic pump connections fluidically connected to the plurality of delivery devices, and (iv) a plurality of reservoir lubricant outlets, a plurality of reservoir lubricant inlets, a plurality of reservoir coolant outlets, and a plurality of reservoir coolant inlets fluidically connected to the coolers.

20 Claims, 10 Drawing Sheets

(58) Field of Classification Search
CPC ... F01M 5/002; F01M 5/005; F01M 2005/023
See application file for complete search history.

(56) References Cited

U.S. PATENT DOCUMENTS

| | | | | |
|---|---|---|---|---|
| RE45,853 E | * | 1/2016 | Neal | F01M 5/00 |
| 10,113,456 B2 | * | 10/2018 | Lee | F01M 11/02 |
| 10,724,469 B2 | * | 7/2020 | Palazzolo | F02F 7/0021 |
| 11,274,884 B2 | * | 3/2022 | Thomas | F28D 9/005 |
| 2013/0288843 A1 | * | 10/2013 | Baum | F16H 57/0436 |
| | | | | 184/14 |
| 2014/0373560 A1 | * | 12/2014 | Koberstein | F25B 1/005 |
| | | | | 62/115 |
| 2015/0184802 A1 | * | 7/2015 | Leising | F16N 39/02 |
| | | | | 184/6.22 |
| 2016/0265490 A1 | | 9/2016 | Azevedo Junior | |
| 2018/0010493 A1 | * | 1/2018 | Reitemann | F01M 5/002 |
| 2018/0347419 A1 | * | 12/2018 | Furuishi | F01M 5/002 |
| 2019/0085970 A1 | * | 3/2019 | Becka | F16H 57/0436 |
| 2021/0003249 A1 | * | 1/2021 | West | F16N 39/06 |

FOREIGN PATENT DOCUMENTS

| | | |
|---|---|---|
| DE | 102016102269 A1 | 8/2016 |
| DE | 102016111112 A1 | 6/2017 |
| DE | 102020203449 A1 | 9/2021 |
| DE | 102020203459 A1 | 9/2021 |
| EP | 2629040 A2 | 8/2013 |

OTHER PUBLICATIONS

English abstract for DE-10 2016 102 269.
English abstract for DE-10 2020 203 449.
English abstract for DE-10 2020 203 459.

* cited by examiner

LUBRICANT AND COOLANT SYSTEM WITH A RESERVOIR AND TWO SUMPS

CROSS-REFERENCE TO RELATED APPLICATIONS

This application claims priority to German Patent Application No. DE 10 2022 200 696.8, filed on Jan. 21, 2022, the contents of which is hereby incorporated by reference in its entirety.

TECHNICAL FIELD

The present invention relates to a system for a motor vehicle through which lead flow paths of a lubricant and flow paths of a coolant. The invention additionally relates to a motor vehicle having such a system.

BACKGROUND

In a motor vehicle, two or more components are usually supplied with a fluid, for example, with a lubricant. Further, a temperature control of the said fluid is usually provided. For this purpose a separate and associated supply and infrastructure is generally provided in motor vehicles for the respective component. Beside an increased installation space, this also requires an increased number of components needed.

SUMMARY

The present invention deals with the objective of stating for a system for a motor vehicle and for a motor vehicle having such a system, improved or at least other embodiments, which eliminate disadvantages of solutions known from the prior art. In particular, the present invention deals with the object of stating, for the system and for the motor vehicle, embodiments, which are characterised by an increased efficiency and/or a more cost-effective production and/or a reduced installation space requirement.

According to the invention, this object is solved through the subject matter of the independent claim(s). Advantageous embodiments are the subject matter of the dependent claim(s).

Accordingly, the present invention is based on the general idea of providing a system as a module for a motor vehicle, which is flowed through by a lubricant and a coolant along different flow paths and comprises a reservoir, to which two delivery devices as well as three coolers are attached, wherein in the reservoir at least one channel is integrally moulded, through which leads a respectively associated flow path. The formation of the channel within the reservoir leads to a reduced flow resistance and consequently to a reduction of the pressure drop in the system. This leads to an increased efficiency of the system and of the associated motor vehicle. Further, fewer components for supplying the components of the associated motor vehicle are required in the system, so that the system saves more installation space and the system as well as the associated motor vehicle are more cost effective.

According to the inventive idea, the system and thus the module comprise two reservoir parts attached to one another, which in the following are also referred to as an upper reservoir part and a lower reservoir part and which form the reservoir. Three flow paths of a lubricant, in particular of oil, which in the following are also referred to as lubricant paths, lead through the reservoir. Thus, a first lubricant path, a second lubricant path and a third lubricant path lead through the reservoir. In addition, two flow paths of a coolant for cooling the lubricant flowing along the lubricant paths lead through the reservoir, which in the following are also referred to as coolant paths. Thus, fluidically separated from the lubricant paths, a first coolant path and a second cooling path lead through the reservoir. In the lower reservoir part, two separate sumps for lubricant are moulded. The reservoir comprises for the respective lubricant path and for the respective coolant path associated inlets and outlets. Thus, the reservoir comprises for the first lubricant path a first reservoir lubricant inlet connection and a first reservoir lubricant outlet connection, through which the first lubricant path leads. In addition, the reservoir for the second lubricant path comprises a second reservoir lubricant inlet connection and a second reservoir lubricant outlet connection, through which the second lubricant path leads. Further, the reservoir for the third lubricant path comprises a third reservoir lubricant inlet connection and a third reservoir lubricant outlet connection, through which the third lubricant path leads. Further, the reservoir comprises for the first coolant path a first reservoir coolant inlet connection and a first reservoir coolant outlet connection, through which the first coolant path leads. In addition, the reservoir comprises for the second coolant path a second reservoir coolant inlet connection and a second reservoir coolant outlet connection, through which the second coolant path leads. Further, the system includes for the first lubricant path and for the second lubricant path respectively an associated delivery device, which is attached to the reservoir. Thus, the system comprises a first delivery device for the first lubricant path and a second delivery device for the second lubricant path. In addition, the reservoir for the respective delivery device comprises two associated fluidic connections, which in the following are also referred to as pump connections. Thus, the reservoir comprises for the first delivery device two fluidic first pump connections, with which the first delivery device is fluidically connected, so that the first delivery device during the operation delivers lubricant along the first lubricant path. Further, the reservoir for the second delivery device comprises two fluidic second pump connections, with which the second delivery device is fluidically connected, so that the second delivery device during the operation delivers lubricant along the second lubricant path. In addition, the system additionally includes for the respective lubricant path a cooler which is attached to the reservoir. Thus, the system comprises for the first lubricant path a first cooler, for the second lubricant path a second cooler and for the third lubricant path a third cooler. For admitting lubricant, the respective cooler comprises an inlet, in the following also referred to as cooler lubricant inlet, and for discharging lubricant, an outlet, in the following also referred to as cooler lubricant outlet.

In addition, the respective cooler for admitting coolant comprises an inlet, in the following also referred to as cooler coolant inlet, and for discharging coolant, an outlet, in the following also referred to as cooler coolant outlet. For the respective cooler lubricant inlet, the reservoir comprises an associated reservoir lubricant outlet and for the respective cooler lubricant outlet an associated reservoir lubricant inlet, so that the associated lubricant path leads through the respective cooler. In addition, the reservoir for the respective cooler coolant inlet comprises an associated reservoir coolant outlet and for the respective cooler coolant outlet an associated reservoir coolant inlet, so that during the operation coolant, fluidically separated from the lubricant path, flows through the respective cooler. Thus, lubricant flowing in the respective cooler along the associated lubricant path during the operation is cooled with coolant. Here, at least one channel is moulded in the reservoir. Here, an associated lubricant path or coolant path delimited by the channel leads through the respective channel.

Here, the term "moulded" in the reservoir is to advantageously mean an integral formation of the respective channel within the reservoir. This means in particular that the reservoir as such forms the at least one channel and/or that for forming the at least one moulded channel, no further parts except the reservoir are present.

It is conceivable that at least one of the at least one channel is moulded in the reservoir by means of both reservoir parts. Advantageously, the respective channel formed by means of both reservoir parts comprises in one of the reservoir parts a channel portion which in the distance direction to the other reservoir part comprises in one of the reservoir parts a channel portion which in the distance direction to the other reservoir part, is open, which for moulding the channel is closed by the other reservoir part. Thus, it is true for the respective channel that the channel in the lower reservoir part comprises a channel portion which is open towards the upper reservoir part, which is closed with the upper reservoir part, so that the channel is moulded or vice versa.

Preferably, at least one of the at least one channels is moulded in one of the reservoir parts. Thus, the channel is integrally moulded in the associated reservoir part. This means in particular that the reservoir part as such forms the at least one channel and/or that for forming the at least one moulded channel no further parts except the reservoir part are present.

In principle, at least one channel each can be moulded in both reservoir parts.

It is advantageous when at least in the upper reservoir part at least one channel is moulded.

Preferably, the respective channel is moulded in the upper reservoir part. Thus, producing the system is simplified.

The reservoir parts can each be produced from any material.

Preferably, the respective reservoir part is produced from a metal or from an alloy, for example from aluminium. Likewise, the respective reservoir part can be produced from a plastic, for example from a polyamide, in particular from fibre-reinforced polyamide, in particular from PA 66 GF 35 HS.

Advantageously, at least one of the at least one channel, preferably the respective channel in the reservoir, is advantageously moulded in the associated reservoir part during the injection moulding of the reservoir part. This means that the reservoir part is produced by means of injection moulding, wherein during the injection moulding at least one insert that is inserted in an associated mould and subsequently removed is arranged, so that following the injection moulding at least one channel is moulded in the reservoir part by means of the at least one insert. Thus, at least one of the channels is moulded in the associated reservoir part by means of such an insert, also known as core. This provides for a particularly cost-effective and simple production of the system.

Here it is conceivable that the at least one of the inserts remains in the associated reservoir part, i.e. is part of the reservoir part. Likewise, at least one insert can be removed from the reservoir part following the injection moulding.

The reservoir parts can basically be formed in any way.

In preferred embodiments, the lower reservoir part is formed pot-shaped and the upper reservoir part plate-like and placed onto the lower reservoir part. The upper reservoir part is thus placed onto the lower reservoir part in the manner of a lid.

In preferred embodiments, at least one of the channels, advantageously the respective channel is moulded in the upper reservoir part. Thus, the channels are preferably moulded in one of the reservoir parts, so that the production of the reservoir and thus of the system is simplified and more cost-effective. When the upper reservoir part is additionally formed plate-shaped, a further reduced flow resistance thus occurs within the at least one channel, thus resulting in increased efficiency.

Advantageously, the pump connections are formed on the lower reservoir part and the delivery devices are attached to the lower reservoir part.

In principle, the respective cooler can be formed in any way.

Advantageous are embodiments in which at least one of the coolers, preferably the respective cooler, is formed as a plate cooler. Thus, the respective cooler can be attached to the reservoir in a simplified and compact manner.

Embodiments are considered advantageous, in which at least one of the coolers, preferably the respective cooler, is placed on the side of the upper reservoir part facing away from the lower reservoir part and attached to the upper reservoir part. Here, the upper reservoir part comprises the reservoir lubricant outlets, the reservoir lubricant inlets, the reservoir coolant outlets and the reservoir coolant inlets.

In advantageous embodiments, the first reservoir lubricant inlet connection is formed on the lower reservoir part. In addition, the first reservoir lubricant outlet connection is formed on the upper reservoir part and faces away from the first reservoir lubricant inlet connection.

According to advantageous variants, the second reservoir lubricant inlet connection is formed on the lower reservoir part. In addition, the second reservoir lubricant outlet connection is advantageously formed on the upper reservoir part and preferably arranged on the same side of the reservoir as the second reservoir lubricant inlet connection. Advantageously, the second reservoir lubricant outlet connection and the second reservoir lubricant inlet connection are parallel to one another.

Advantageous are embodiments, in which the third reservoir lubricant inlet connection and the third reservoir lubricant outlet connection are formed on the upper reservoir part and are arranged on the same side of the reservoir. Preferably, the third reservoir lubricant inlet connection and the third reservoir lubricant outlet connection are parallel to one another.

In advantageous embodiments, the first reservoir coolant inlet connection and the first reservoir coolant outlet connection are formed on the upper reservoir part and are arranged on different sides of the reservoir.

According to advantageous embodiments, the second reservoir coolant inlet connection and the second reservoir coolant outlet connection are formed on the upper reservoir part and are arranged on different sides of the reservoir.

Preferably, the first reservoir coolant inlet connection and the second reservoir coolant outlet connection are parallel to one another.

Advantageously, the second reservoir coolant inlet connection and the first reservoir coolant outlet connection are parallel to one another.

Practically, the reservoir comprises two sides each facing away from one another. Thus, the reservoir comprises a first side and a second side facing away from the first side. In addition, the reservoir comprises a third side and a fourth side facing away from the third side. The first and second sides run inclined or transversely, preferably transversely to the third and fourth side. Preferably, the third and the fourth side connect the first and the second side with one another.

Advantageously, the pump connections are arranged on the first side of the reservoir. Advantageously, the second reservoir coolant inlet connection and the first reservoir coolant outlet connection are arranged on the second side of the reservoir. Advantageously, the first reservoir coolant inlet connection and the second reservoir coolant outlet connection as well as the first reservoir lubricant inlet connection are arranged on the third side of the reservoir. Advantageously, the second reservoir lubricant inlet connection and the second reservoir lubricant outlet connection as well as the first reservoir lubricant outlet connection are arranged on the fourth side of the reservoir.

In principle, the coolant paths can lead through the reservoir fluidically separated from one another.

It is also conceivable that the coolant paths intersect in the reservoir, in particular in the upper reservoir part. Thus, a flow of the coolant between the coolant paths can occur within the reservoir.

In advantageous embodiments, the system comprises for at least one of the lubricant paths an associated temperature sensor and the reservoir for the respective temperature sensor an associated connection, in the following also referred to as sensor connection.

Preferred are embodiments, in which the system for the first lubricant path and for the second lubricant path comprises an associated temperature sensor each. Thus, the system comprises for the first lubricant path a first temperature sensor. The reservoir comprises for the first temperature sensor a first sensor connection, through which the first temperature sensor enters the first lubricant path, in particular between the first reservoir lubricant inlet connection and the first delivery direction. In addition, the system comprises a second temperature sensor for the second lubricant path. For the second temperature sensor, the reservoir comprises a second sensor connection through which the second temperature sensor enters the second lubricant path, in particular between the second reservoir lubricant inlet connection and the second delivery connection.

Preferred are embodiments, in which the first lubricant path leads to a first of the sumps. In addition, the first reservoir lubricant inlet connection is fluidically connected to the first sump so that the first lubricant path leads from the first reservoir lubricant inlet connection to the first cooler into the first sump and through the first reservoir lubricant outlet connection.

In advantageous embodiments, the second lubricant path leads through a second of the sumps. In addition, the second reservoir lubricant inlet connection is fluidically connected to the second sump, so that the second lubricant path leads from the second reservoir lubricant inlet connection to the second cooler into the second sump and through the second reservoir lubricant outlet connection.

The system is employed in the motor vehicle for supplying different components with lubricant.

Preferably, the respective lubricant path serves for supplying an associated component with lubricant, in particular with oil.

Preferably, the motor vehicle comprises a first electric machine, a second electric machine and a transmission, which are each supplied with lubricant via the system.

The respective electric machine can be designed as an electric motor.

Advantageously, the first lubricant path leads through the first electric machine, the second lubricant path through the second electric machine and the third lubricant path through the transmission.

It is to be understood that besides the system, the motor vehicle having the system is also part of the scope of this invention.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference numbers relate to same or similar, or functionally same components.

BRIEF DESCRIPTION OF THE DRAWINGS

It Shows, in Each Case Schematically

DETAILED DESCRIPTION

Figure 1:
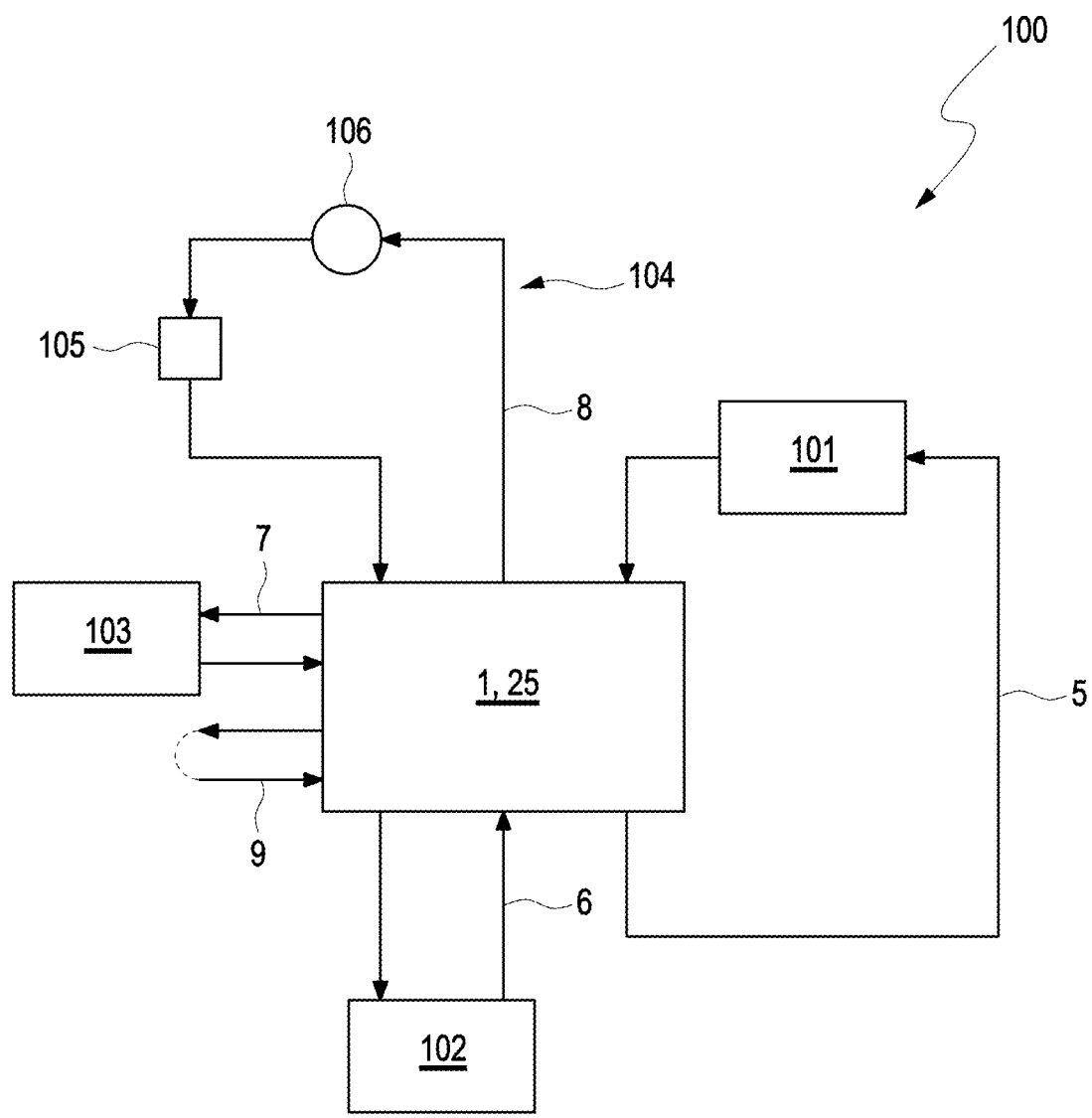
FIG. 1 shows a greatly simplified representation in the manner of a circuit diagram of a motor vehicle having a system.

A system 1, such as is shown for example in the FIGS. 1 to 10, is employed as a module 25 in a motor vehicle 100 exemplarily shown in FIG. 1.

In the shown exemplary embodiment, the motor vehicle 100 besides the system 1 comprises a first electric machine 101, a second electric machine 102 and a transmission 103, each of which are supplied with a lubricant, for example with oil, via the system 1 during the operation. For this purpose, associated flow paths 5, 6, 7 of the lubricant each lead through the system 1, which in the following are also referred to as lubricant paths 5, 6, 7. There, a first lubricant path 5 leads through the system 1 and through the first electric machine 101. A second lubricant path 6 leads through the system 1 and through the second electric machine 102. In addition, a third lubricant path 7 leads through the system 1 and through the transmission 103.

As is evident from FIGS. 2 to 10, the system 1 comprises two reservoir parts 2, 3 attached to one another, which in the following can also be referred to as upper reservoir part 2 and lower reservoir part 3. The upper reservoir part 2 and the lower reservoir part 3 jointly form a reservoir 4 of the system 1. As is evident in particular from FIG. 4, the lower reservoir part 3 in the shown exemplary embodiment is designed pot-shaped. The upper reservoir part 2 is designed plate-like and placed onto the lower reservoir part 3. The upper reservoir part 2 closes off the lower reservoir part 3 in the manner of a lid.

The lubricant paths 5, 6, 7 lead through the reservoir 4. In the system 1, the lubricant flowing along the respective lubricant path 5, 6, 7 is cooled during the operation. For this purpose, two flow paths 8, 9 of a coolant lead through the reservoir 4, fluidically separated from the lubricant paths 5, 6, 7. In the following, the flow paths 8, 9 are also referred to as coolant paths 8, 9. Thus, a first coolant path 8 and a second coolant path 9 lead through the reservoir 4. As is evident in particular from FIG. 5, two separate sumps 10, namely a first sump 10a and a second sump 10b, for lubricant are moulded in the lower reservoir part 3. The reservoir 4 comprises for the respective lubricant 5, 6, 7 an associated inlet 11 for admitting the lubricant and an associated outlet 12 for discharging the lubricant. The inlets 11 are also referred to as reservoir lubricant inlet connections 11 and the outlets 12 as reservoir lubricant outlet connections 12 in the following. Thus, the reservoir 4 comprises for the first lubricant path 5 a first reservoir lubricant inlet connection 11a and a first reservoir lubricant outlet connection 12a, through which the first lubricant path 5 leads. In addition, the reservoir 4 for the second lubricant path 6 comprises a second reservoir lubricant inlet connection 11b and a second reservoir lubricant outlet connection 12b, through which the second lubricant path 6 leads. Further, the reservoir 4 for the third lubricant path 7 comprises a third reservoir lubricant inlet connection 11c and a third reservoir lubricant outlet connection 12c, through which the third lubricant path 7 leads. Further, the reservoir 4 comprises for the respective coolant path 8, 9 an associated inlet 13 for admitting the coolant and an associated outlet 14 for discharging the coolant. In the following, the inlets 13 are also referred to as reservoir coolant inlet connections 13 and the outlets 14 as reservoir coolant outlet connections 13. Thus, the reservoir 4 comprises for the first coolant path 8 a first reservoir coolant inlet connection 13a and a first reservoir coolant outlet connection 14a, through which the first coolant path 8 leads. In addition, the reservoir 4 for the second coolant path 9 comprises a second reservoir coolant inlet connection 13b and a second reservoir coolant outlet connection 14b, through which the second coolant path 9 leads. Further, the system 1 comprises for the first lubricant path 5 and the second lubricant path 6 a delivery device 15 each for delivering lubricant along the associated lubricant path 5, 6. Thus, the system 1 comprises a first delivery device 15a for the first lubricant path 5 and a second delivery device 15b for the second lubricant path 6. Here, the respective delivery device 15 is attached to the reservoir 4. The reservoir 4 comprises for the respective delivery device 15 to associated fluidic connections 16, 17, with which the delivery device 15 is fluidically connected for delivering lubricant. The connections 16, 17 are also referred to as pump connections 16, 17 in the following. Thus, the reservoir 4 comprises for the first delivery device 15a two fluidic first pump connections 16, with which the first delivery device 15a is fluidically connected and into which the first delivery device 15a in the shown exemplary embodiment is inserted, so that the first lubricant path 5 leads through the first pump connections 16 and the first delivery device 15a delivers lubricant along the first lubricant path 5 during the operation. In addition, the reservoir 4 comprises for the second delivery device 15b two fluidic second pump connections 17, with which the first delivery device 15b is fluidically connected, into which in the shown exemplary embodiment the second delivery device 15b is inserted, so that the second lubricant path 6 leads through the second pump connections 17 and the second delivery device 15b delivers lubricant along the second lubricant path 6 during the operation. As is evident in particular from FIG. 2, the pump connections 16, 17 are formed on the lower reservoir part 3 in the shown exemplary embodiment. In addition, the delivery device 15 are attached to the lower reservoir part 3 in the shown exemplary embodiment.

Further, the system 1 for cooling the lubricant flowing through the respective lubricant path 5, 6, 7 comprises an associated cooler 18, which is attached to the reservoir 4. Thus, the system 1 comprises for the first lubricant path 5 a first cooler 18a, for the second lubricant path 6 a second cooler 18b and for the third lubricant path 7 a third cooler 18c. The respective cooler 18 comprises a cooler lubricant inlet for admitting lubricant, a cooler lubricant outlet for discharging lubricant, a cooler coolant inlet for admitting coolant and a cooler coolant outlet for discharging coolant, each of which are not visible in the figures. As is evident for example from FIG. 4, the reservoir 4 comprises for the respect cooler lubricant inlet and associated reservoir lubricant outlet 19 and for the respective cooler lubricant outlet an associated reservoir lubricant inlet 20, so that the associated lubricant path 5, 6, 7 leads through the respective cooler 18. In addition, the reservoir 4 comprises for the respective cooler coolant inlet an associated reservoir coolant outlet 21 and for the respective cooler coolant outlet an associated reservoir coolant inlet 22, so that coolant, fluidically separated from the lubricant path 5, 6, 7 coolant flows through the respective cooler 18 during the operation and so that during the operation lubricant flowing along the associated lubricant path 5, 6, 7 is cooled with coolant in the respective cooler 18. As is evident in particular from FIG. 3, the respective cooler 18 is formed as a plate cooler 26 in the shown exemplary embodiment.

Figure 4:
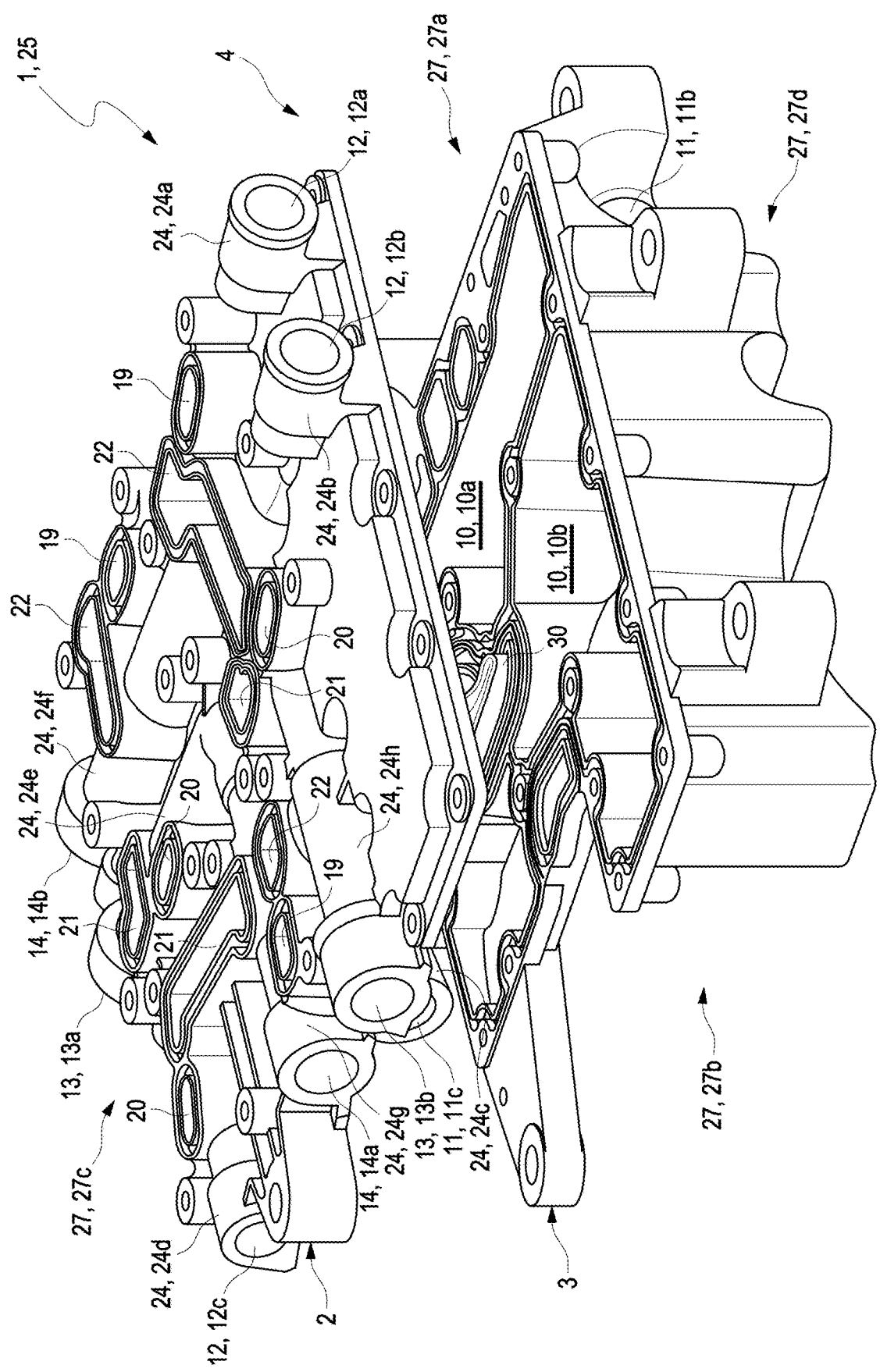
FIG. 4 shows an isometric exploded representation of a reservoir of the system.
Figure 5:
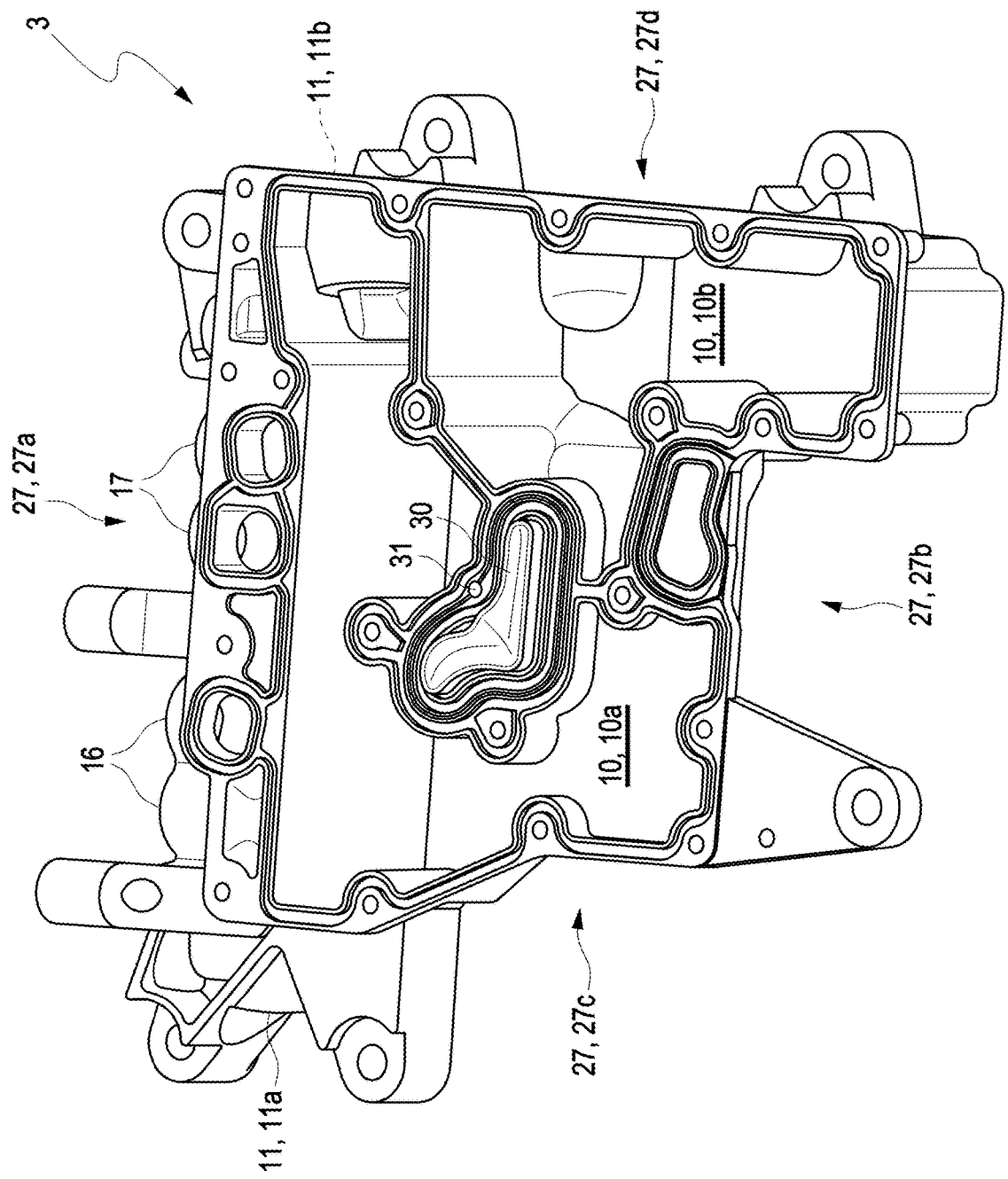
FIG. 5 shows an isometric view of a lower reservoir part of the reservoir.
Figure 6:
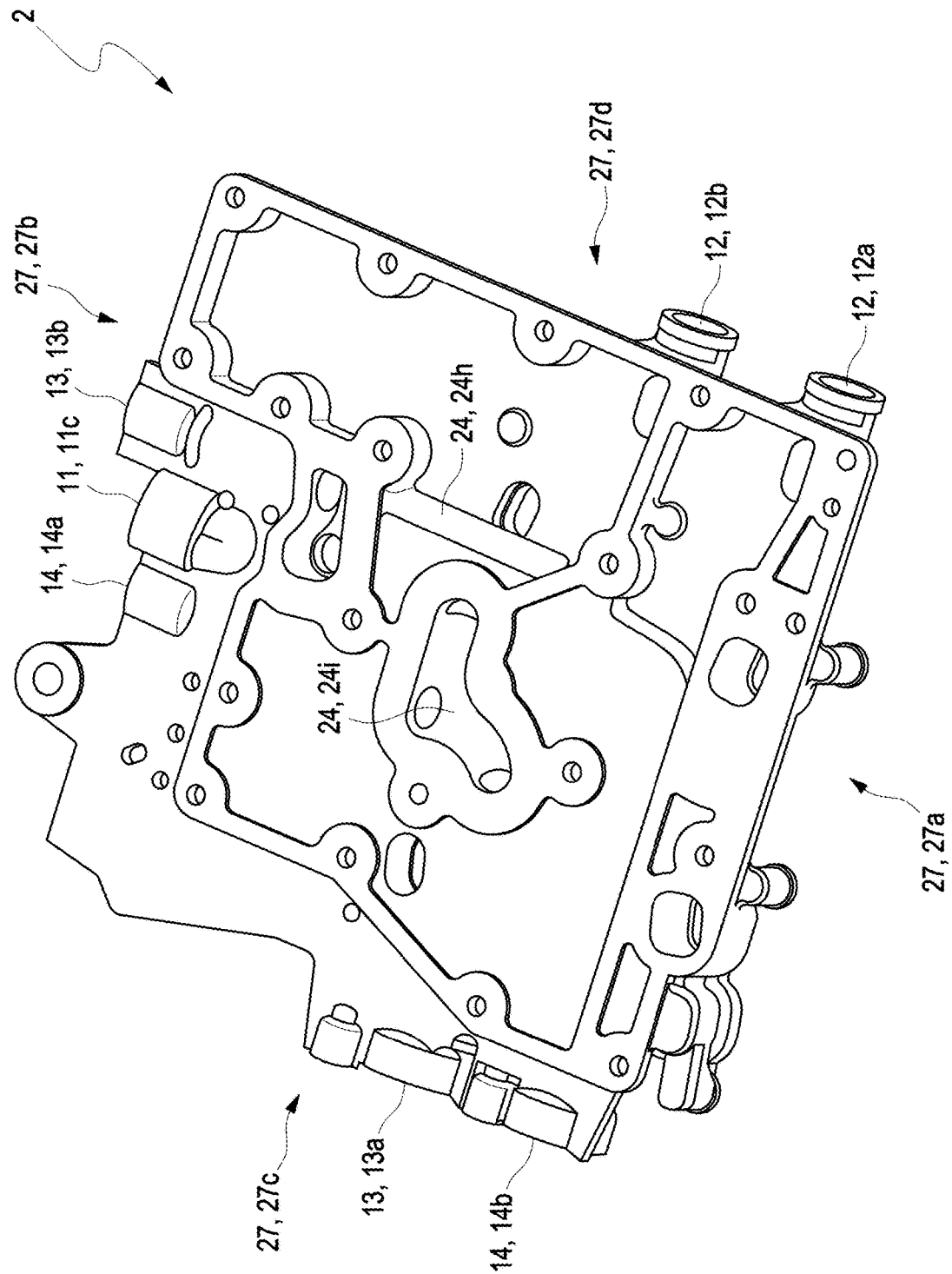
FIG. 6 shows an isometric view of an upper reservoir part of the reservoir.
Figure 7:
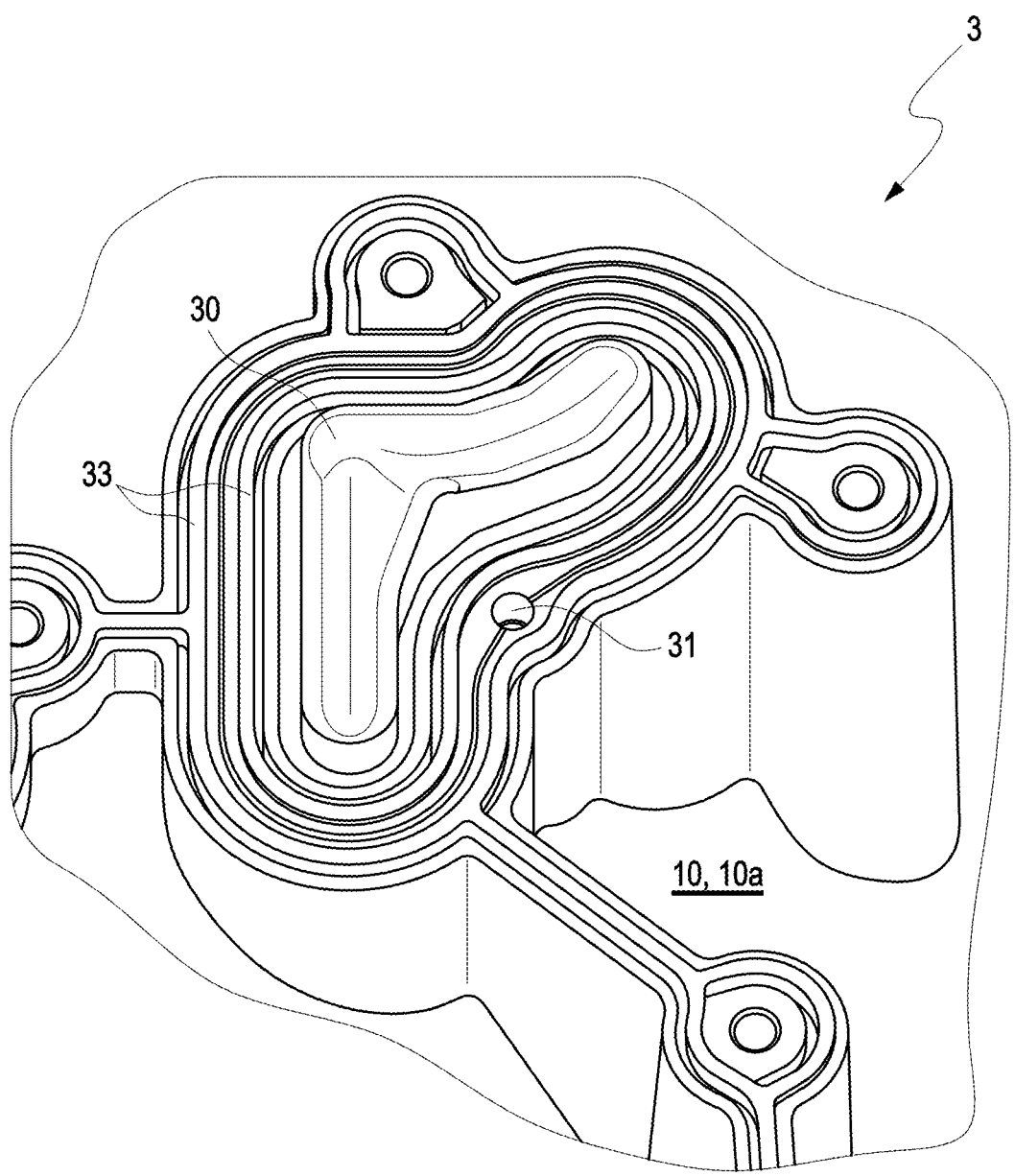
FIG. 7 shows an isometric detailed view of the lower reservoir part.
Figure 8:
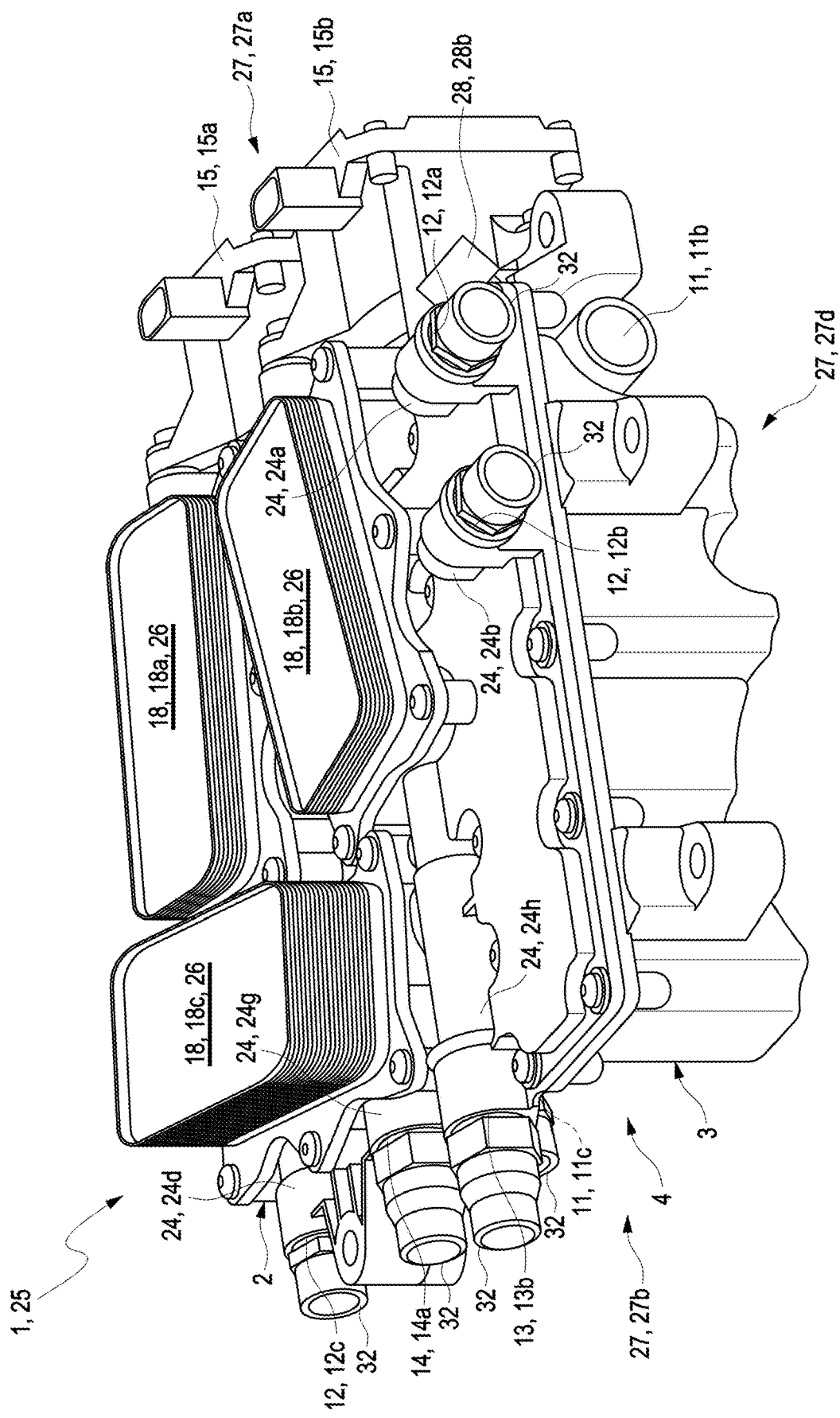
FIG. 8 shows an isometric view of the system.
Figure 9:
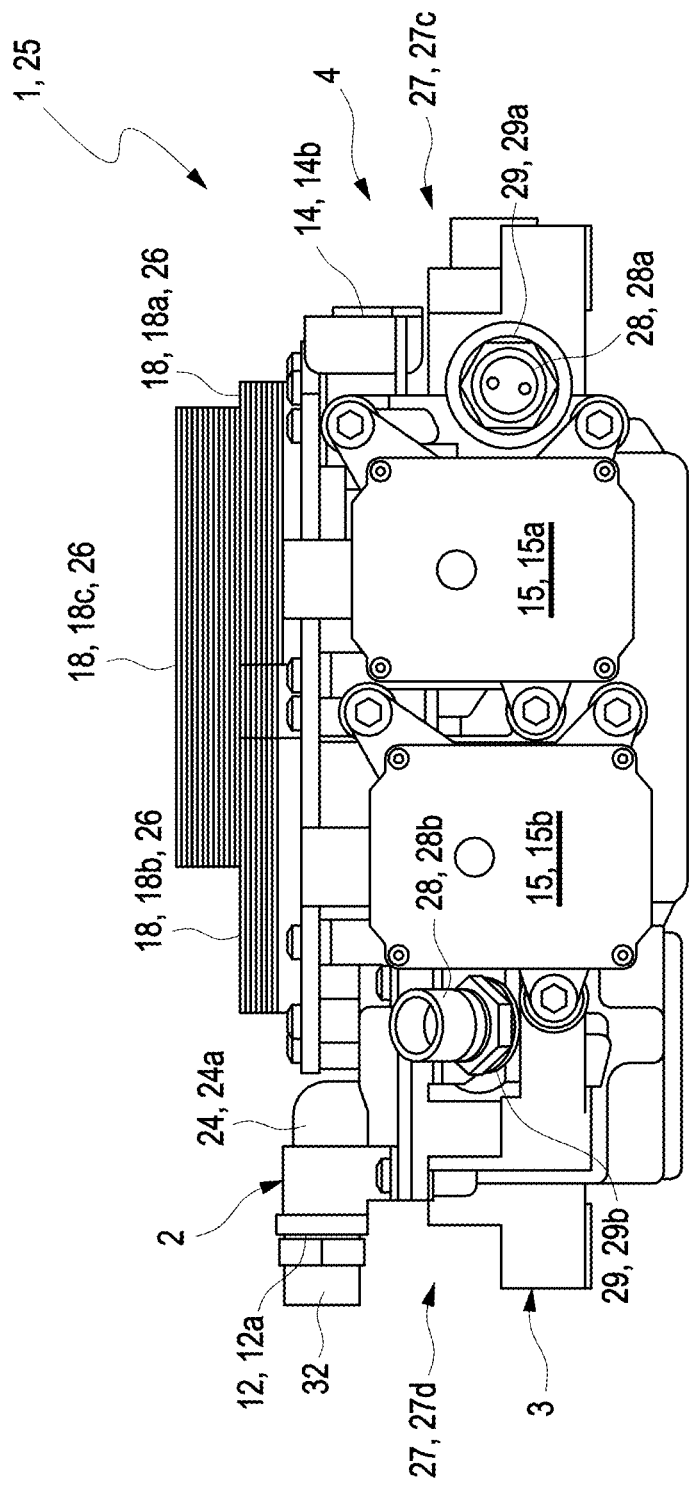
FIG. 9 shows a lateral view of the system.
Figure 10:
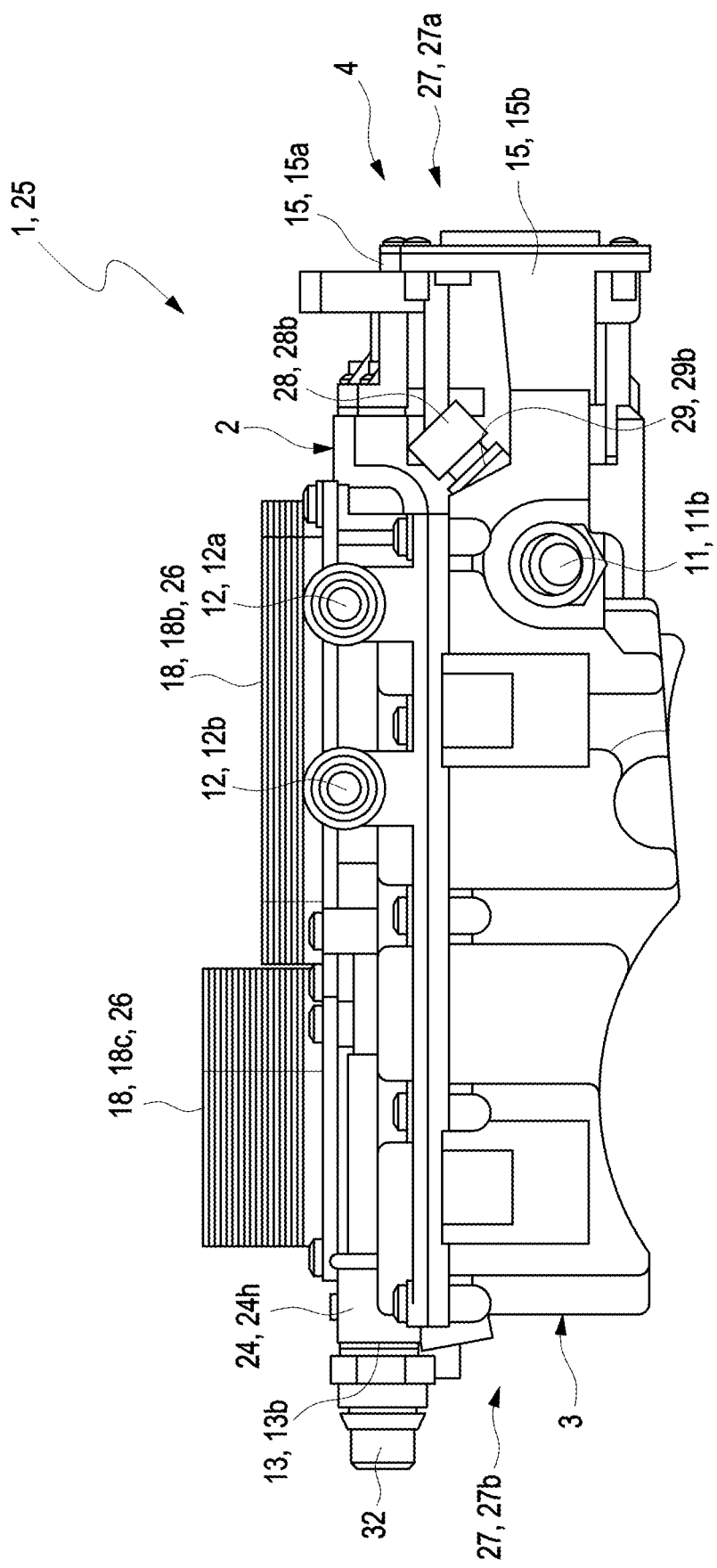
FIG. 10 shows another lateral view of the system.

As is evident in particular from FIG. 4, at least one channel 24 is moulded in the reservoir 4. In the shown exemplary embodiment, at least one channel 24 is moulded in at least one of the reservoir parts 2, 3. In the shown exemplary embodiment, at least one channel 24 for the at least one of the flow paths 5, 6, 7, 8, 9 is moulded in the upper reservoir part 2. Thus, at least one channel 24 is moulded in the upper reservoir part 2, wherein an associated lubricant path 5, 6, 7 or coolant path 8, 9 leads through the respective channel 24. Thus, the system 1 is designed in a simple manner and with fewer individual components. Further, a reduced pressure drop along the associated flow paths 5, 6, 7, 8, 9 occurs because of the at least one channel 24.

The reservoir parts 2, 3 are advantageously produced from a light metal, for example from aluminium, or from plastic, for example from fibre-reinforced polyamide, in particular from PA 66 GF 35 HS. Here, the respective channel 24 can be produced in the upper reservoir part 2 in that the upper reservoir part 2 is injection moulded, wherein the respective channel 24 is produced by means of an insert (not shown) during the injection moulding, which is removed from an associated injection mould (not shown) after the injection moulding, so that the respective channel 24 is moulded in the upper reservoir part 2.

Figure 2:
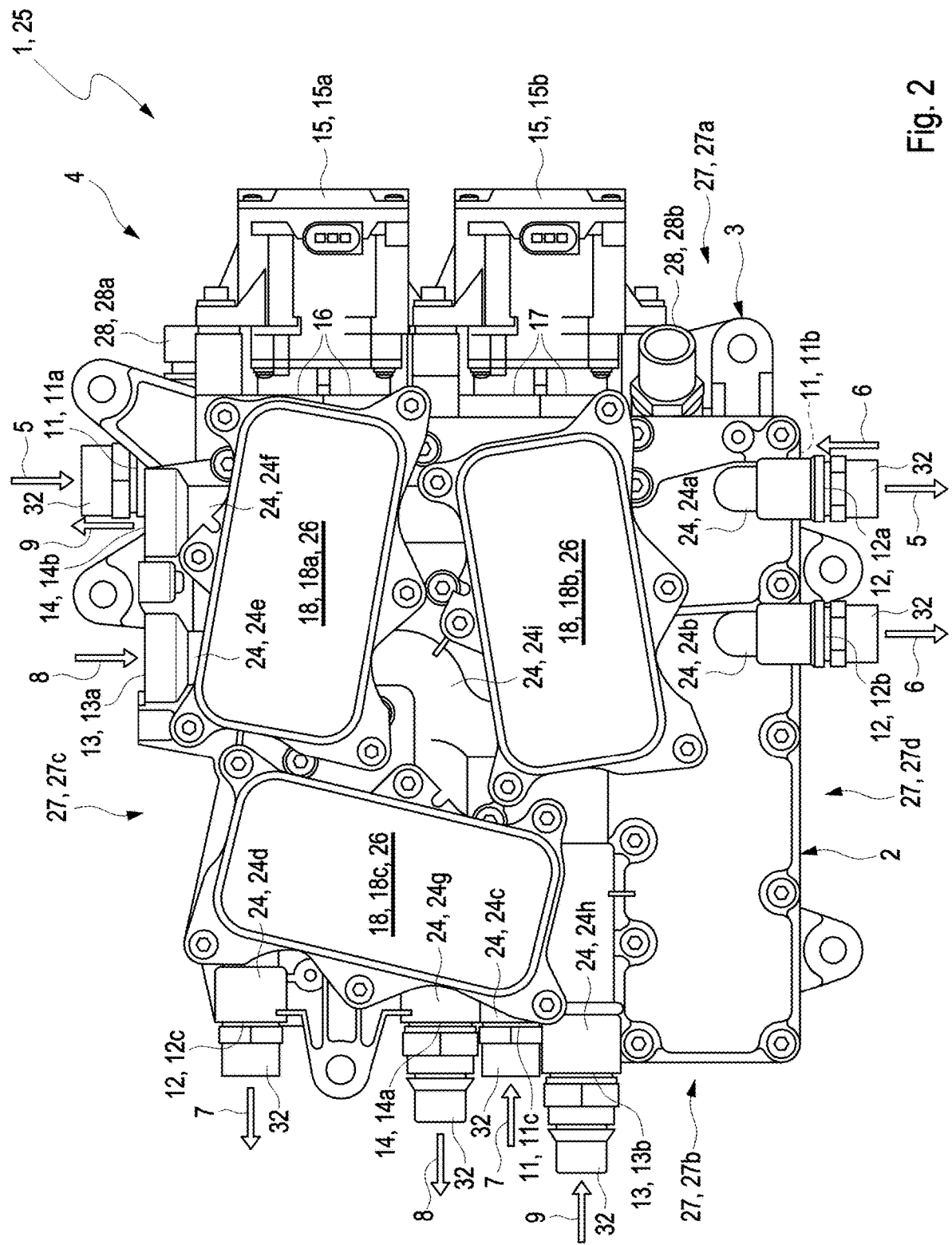
FIG. 2 shows a plan view of the system.
Figure 3:
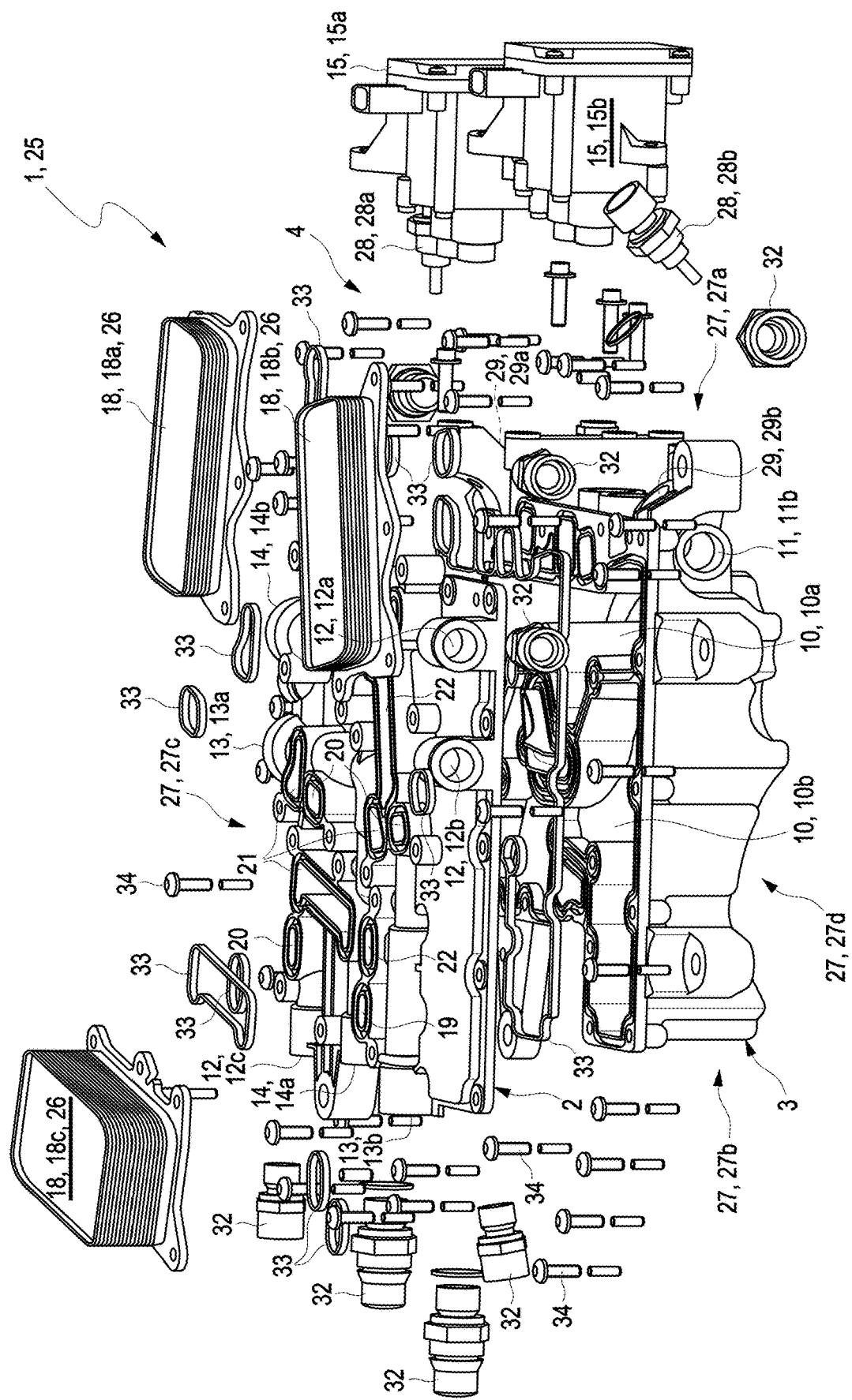
FIG. 3 shows an isometric exploded representation of the system.

As is evident for example from FIGS. 2 and 3, the coolers 18 in the shown exemplary embodiment are placed onto the side of the upper reservoir part 2 facing away from the lower reservoir part 3 and attached to the upper reservoir part 2. Thus, the upper reservoir part 2 comprises the reservoir lubricant outlets 19, the reservoir lubricant inlets 20, the reservoir coolant outlets 21 and the reservoir coolant inlets 22.

As is evident in particular from FIG. 2 and FIG. 4, multiple channels 24 are moulded in the upper reservoir part 2 in the shown exemplary embodiment. In the shown exemplary embodiment, the upper housing part 2 comprises a first channel 24a for the first lubricant path 5, which includes the first reservoir lubricant outlet connection 12a. In addition, the upper housing part 2 comprises a second channel 24b for the second lubricant path 6, which includes the second reservoir lubricant outlet connection 12b. A third channel 24c for the third lubricant path 7 includes the third reservoir lubricant inlet connection 11c and a fourth channel 24d for the third lubricant path 7 includes the third reservoir lubricant outlet connection 12c. Further, the upper housing part 2 comprises a fifth channel 24e and a sixth channel 24f for the first coolant path 8 and the second coolant path 9, wherein the fifth channel 24e includes the first reservoir coolant inlet connection 13a and the sixth channel 24f the second reservoir coolant outlet connection 14b. In addition, the upper housing part 2 comprises for the first coolant path 8 a seventh channel 24g and for the second coolant path 9 an eighth channel 24h. The seventh channel 24g includes the first reservoir coolant outlet connection 14a. The eighth channel 24h includes the second reservoir coolant inlet connection 13b.

As is evident in particular from FIG. 2, the first coolant path 8 leads via the first housing coolant inlet connection 13a into the fifth channel 24e and via the first cooler 18a and the seventh channel 24g to the first housing coolant outlet connection 14a. The second coolant path 9 leads via the second housing coolant inlet connection 13b into the eighth channel 24h and via the second cooler 18b to the sixth channel 24f out of the second housing coolant outlet connection 14b. As is evident in particular from the FIGS. 2 and 6, the sixth channel 24f and the seventh channel 24g respectively are, further, fluidically connected via a ninth channel 24i of the upper housing part 2 with the fifth channel 24e and the eighth channel 24h respectively in the shown exemplary embodiment. As is evident from FIG. 6, the ninth channel 24i is open on the side facing the lower reservoir part 3. There, an associated projection 30 of the lower reservoir part 3 that is visible in particular in the FIGS. 5 and 7, engages into the ninth channel 24i and comprises a drainage opening 31 for draining coolant accrued.

In the shown exemplary embodiment, the first lubricant path 5 leads through the first sumps 10a. In addition, the first reservoir lubricant inlet connection 11a is fluidically connected to the first sump 10a. Thus, the first lubricant path 5 leads from the first reservoir lubricant inlet connection 11a to the first cooler 18a into the first sump 10a and through the first reservoir lubricant outlet connection 12a. In addition, the second lubricant path 6 in the shown exemplary embodiment leads through the second sump 10b and the second reservoir lubricant inlet connection 11b is fluidically connected to the second sump 10b. Consequently, the second lubricant path 6 leads from the second reservoir lubricant inlet connection 11b to the second cooler 18b into the second sump 10b and through the second reservoir lubricant outlet connection 12b.

The reservoir 4 comprises two sides 27 each facing away from one another. Thus, the reservoir comprises a first side 27a and a second side 27b, which face away from one another. In addition, the reservoir 4 comprises a third side 27c and a fourth side 27d, which face away from one another. In the shown exemplary embodiment, the third side 27c and the fourth side 27d run substantially transversely to the first side 27a and the second side 27b. The pump connections 16, 17 are arranged on the first side 27a.

According to FIG. 2, the first reservoir lubricant inlet connection 11a in the shown exemplary embodiment is formed on the lower reservoir part 3. In addition, the first reservoir lubricant outlet connection 12a is formed in the shown exemplary embodiment on the upper reservoir part 2 and faces away from the first reservoir lubricant inlet connection 11a. As is evident in particular from FIG. 4, the second reservoir lubricant inlet connection 11b in the shown exemplary embodiment is formed on the lower reservoir part 3. In addition, the second reservoir lubricant outlet connection 12b is arranged on the upper reservoir part 2 and with the second reservoir lubricant inlet connection 11b on the fourth side 27d of the reservoir 4.

As is evident in particular from FIG. 4, the third reservoir lubricant inlet connection 11c and the third reservoir lubricant outlet connection 12c are formed on the upper reservoir part 2 and arranged on the second side 27b of the reservoir 4.

As is evident in particular from FIG. 4, the first reservoir coolant inlet connection 13a and the second reservoir coolant outlet connection 14b are arranged in the shown exemplary embodiment on the third side 27c of the reservoir 4. In addition, the second reservoir coolant inlet connection 13b and the first reservoir coolant outlet connection 14a are arranged in the shown exemplary embodiment on the second side 27b of the reservoir 4.

As is further evident for example from FIG. 4, the third reservoir lubricant inlet connection 11c and the third reservoir lubricant outlet connection 12c are formed on the upper reservoir part 2 and arranged on the second side 27b of the reservoir.

In the shown exemplary embodiment, as is evident in particular from FIG. 2, the system 1 comprises for the first lubricant path 5 and the second lubricant path 6 an associated temperature sensor 28 each. Thus, the system 1 comprises for the first lubricant path 5 a first temperature sensor 28a and for the second lubricant path 6 a second temperature sensor 28b. In addition, the reservoir 4 comprises for the respective temperature sensor 28 an associated connection 29, which in the following is also referred to as sensor connection 29. Thus, the reservoir 4 comprises for the first temperature sensor 28 a first sensor connection 29a, through which the first temperature sensor 28a enters the first lubricant path 5. In the shown exemplary embodiment, the first temperature sensor 28a enters the first lubricant path 5 between the first reservoir lubricant inlet connection 11a and the first delivery device 15a. In addition, the reservoir 4 comprises for the second temperature sensor 28 a second sensor connection 29b, through which the second temperature sensor 28b enters the second lubricant path 6. In the shown exemplary embodiment, the second temperature sensor 28b enters the second lubricant path 6 between the second reservoir lubricant inlet connection 11b and the second delivery connection 15b.

As is evident in particular from FIG. 2, the system 1 can comprise for at least one of the connections 11, 12, 13, 14, 16, 17 an associated connector 32. Further, the system comprises seals 33 between the reservoir parts 2, 3 and between the coolers 18 and the upper reservoir part 2. In addition, the reservoir parts 2, 3 in the shown exemplary embodiment are attached to one another and the coolers 18 as well as delivery devices 15 to the reservoir 4 by means of screws 34.

As is evident from FIG. 1, at least one of the coolant paths 8, 9 can lead through a cooling circuit 104. In the shown exemplary embodiment, the first coolant path 8, purely exemplarily, leads through a cooling circuit 104, which comprises further parts, for example a coolant cooler 105 for cooling the coolant and a coolant pump 106 for delivering the coolant.

The invention claimed is:

1. A system for a motor vehicle, comprising:
an upper reservoir part and a lower reservoir part attached to the upper reservoir part, which collectively form a reservoir;
a plurality of lubricant paths extending through the reservoir, the plurality of lubricant paths including a first lubricant path, a second lubricant path, and a third lubricant path;
a plurality of coolant paths extending through the reservoir;
the plurality of coolant paths fluidically separated from the plurality of lubricant paths;
the plurality of coolant paths including a first coolant path and a second coolant path;
two separate sumps for lubricant, the two sumps moulded in the lower reservoir part;
a plurality of delivery devices attached to the reservoir, the plurality of delivery devices including a first delivery device for the first lubricant path and a second delivery device for the second lubricant path;
the reservoir including:
  a first reservoir lubricant inlet connection and a first reservoir lubricant outlet connection through which the first lubricant path extends;
  a second reservoir lubricant inlet connection and a second reservoir lubricant outlet connection through which the second lubricant path extends;
  a third reservoir lubricant inlet connection and a third reservoir lubricant outlet connection through which the third lubricant path extends;
  a first reservoir coolant inlet connection and a first reservoir coolant outlet connection through which the first coolant path extends;
  a second reservoir coolant inlet connection and a second reservoir coolant outlet connection through which the second coolant path extends;
  two fluidic first pump connections fluidically connected to the first delivery device such that lubricant is deliverable along the first lubricant path via the first delivery device;
  two fluidic second pump connections fluidically connected to the second delivery device such that lubricant is deliverable along the second lubricant path via the second delivery device;
  a plurality of reservoir lubricant outlets;
  a plurality of reservoir lubricant inlets;
  a plurality of reservoir coolant outlets; and
  a plurality of reservoir coolant inlets;
a plurality of coolers attached to the reservoir, the plurality of coolers including a first cooler for the first lubricant path, a second cooler for the second lubricant path, and a third cooler for the third lubricant path;
the plurality of coolers each including:
  a cooler lubricant inlet fluidically connected to an associated reservoir lubricant outlet of the plurality of reservoir lubricant outlets;
  a cooler lubricant outlet fluidically connected to an associated reservoir lubricant inlet of the plurality of reservoir lubricant inlets;
  a cooler coolant inlet fluidically connected to an associated reservoir coolant outlet of the plurality of reservoir coolant outlets; and
  a cooler coolant outlet fluidically connected to an associated reservoir coolant inlet of the plurality of reservoir coolant inlets;
wherein the plurality of coolers are each extended through via an associated lubricant path of the plurality of lubricant paths;
wherein coolant is flowable through each of the plurality of coolers such that, during operation, lubricant flowing along the plurality of lubricant paths is cooled with coolant in the plurality of coolers;
wherein at least one channel is moulded in and defined by the reservoir; and
wherein at least one of (i) at least one lubricant path of the plurality of lubricant paths and (ii) at least one coolant path of the plurality of coolant paths is at least partially delimited by and extends through the at least one channel.

2. A system according to claim 1, wherein the at least one channel is moulded in and at least partially defined by at least one of the upper reservoir part and the lower reservoir part.

3. The system according to claim 1, wherein:
at least one of the upper reservoir part and the lower reservoir part is an injection moulded component; and
the at least one channel is formed via an insert when injection moulding the at least one of the upper reservoir part and the lower reservoir part.

4. The system according to claim 1, wherein:
the lower reservoir part is pot-shaped;
the upper reservoir part has a plate-like shape and is arranged on the lower reservoir part; and
the at least one channel is integrally formed in and defined by the upper reservoir part.

5. The system according to claim 1, wherein:
the two fluidic first pump connections and the two fluidic second pump connections are arranged on the lower reservoir part; and
the first delivery device is attached to the lower reservoir part at the two fluidic first pump connections and the second delivery device is attached to the lower reservoir part at the two fluidic second pump connections.

6. The system according to claim 1, wherein:
the plurality of coolers are arranged on a side of the upper reservoir part facing away from the lower reservoir part and are attached to the upper reservoir part; and
the upper reservoir part includes the plurality of reservoir lubricant outlets, the plurality of reservoir lubricant inlets, the plurality of reservoir coolant outlets, and the plurality of reservoir coolant inlets.

7. The system according to claim 1, wherein:
the first reservoir lubricant inlet connection is disposed on the lower reservoir part; and
the first reservoir lubricant outlet connection is disposed on the upper reservoir part and faces away from the first reservoir lubricant inlet connection.

8. The system according to claim 1, wherein:
the second reservoir lubricant inlet connection is disposed on the lower reservoir part; and
the second reservoir lubricant outlet connection is disposed on the upper reservoir part and is arranged on the same side of the reservoir as the second reservoir lubricant inlet connection.

9. The system according to claim 1, wherein the third reservoir lubricant inlet connection and the third reservoir lubricant outlet connection are disposed on the upper reservoir part and are arranged on the same side of the reservoir.

10. The system according to claim 1, wherein the first reservoir coolant inlet connection and the first reservoir coolant outlet connection are disposed on the upper reservoir part and are arranged on different sides of the reservoir.

11. The system according to claim 1, wherein the second reservoir coolant inlet connection and the second reservoir coolant outlet connection are disposed on the upper reservoir part and are arranged on different sides of the reservoir.

12. The system according to claim 1, further comprising a first temperature sensor and a second temperature sensor, wherein the reservoir further includes:
 a first sensor connection through which the first temperature sensor extends into the first lubricant path;
 a second sensor connection through which the second temperature sensor extends into the second lubricant path.

13. The system according to claim 1, wherein the first lubricant path extends through a first sump of the two sumps and the first reservoir lubricant inlet connection is fluidically connected to the first sump such that the first lubricant path extends from the first reservoir lubricant inlet connection to the first cooler, into the first sump, and through the first reservoir lubricant outlet connection.

14. The system according to claim 13, wherein the second lubricant path extends through a second sump of the two sumps and the second reservoir lubricant inlet connection is fluidically connected to the second sump such that the second lubricant path extends from the second reservoir lubricant inlet connection to the second cooler, into the second sump, and through the second reservoir lubricant outlet connection.

15. The system according to claim 1, further comprising:
 a first temperature sensor extending into the first lubricant path between the first reservoir lubricant inlet connection and the first delivery device; and
 a second temperature sensor extending into the second lubricant path between the second reservoir lubricant inlet connection and the second delivery device.

16. The system according to claim 1, wherein the second lubricant path extends through a sump of the two sumps and the second reservoir lubricant inlet connection is fluidically connected to the sump such that the second lubricant path extends from the second reservoir lubricant inlet connection to the second cooler, into the sump, and through the second reservoir lubricant outlet connection.

17. The system according to claim 1, wherein:
 the first reservoir lubricant inlet connection and the second reservoir lubricant inlet connection are disposed on the lower reservoir part; and
 the first reservoir lubricant outlet connection, the second reservoir lubricant outlet connection, the third reservoir lubricant inlet connection, the third reservoir lubricant outlet connection, the first reservoir coolant inlet connection, the first reservoir coolant outlet connection, the second reservoir coolant inlet connection, and the second reservoir coolant outlet connection are disposed on the upper reservoir part.

18. The system according to claim 1, wherein:
 the first reservoir lubricant outlet connection faces away from the first reservoir lubricant inlet connection;
 the second reservoir lubricant inlet connection and the second reservoir lubricant outlet connection are arranged on the same side of the reservoir;
 the third reservoir lubricant inlet connection and the third reservoir lubricant outlet connection are arranged on the same side of the reservoir;
 the first reservoir coolant inlet connection and the first reservoir coolant outlet connection are arranged on different sides of the reservoir; and
 the second reservoir coolant inlet connection and the second reservoir coolant outlet connection are arranged on different sides of the reservoir.

19. A motor vehicle, comprising a system, a first electric machine, a second electric machine, and a transmission, wherein:
 the system includes:
  an upper reservoir part and a lower reservoir part attached to the upper reservoir part, which collectively form a reservoir;
  a plurality of lubricant paths extending through the reservoir, the plurality of lubricant paths including a first lubricant path, a second lubricant path, and a third lubricant path;
  a plurality of coolant paths extending through the reservoir and fluidically separated from the plurality of lubricant paths, the plurality of coolant paths including a first coolant path and a second coolant path;
  two separate sumps for lubricant, the two sumps moulded in the lower reservoir part;
  a plurality of delivery devices attached to the reservoir, the plurality of delivery devices including a first delivery device for the first lubricant path and a second delivery device for the second lubricant path; and
  a plurality of coolers attached to the reservoir, the plurality of coolers including a first cooler for the first lubricant path, a second cooler for the second lubricant path, and a third cooler for the third lubricant path;
 the reservoir includes:
  a first reservoir lubricant inlet connection and a first reservoir lubricant outlet connection through which the first lubricant path extends;
  a second reservoir lubricant inlet connection and a second reservoir lubricant outlet connection through which the second lubricant path extends;
  a third reservoir lubricant inlet connection and a third reservoir lubricant outlet connection through which the third lubricant path extends;
  a first reservoir coolant inlet connection and a first reservoir coolant outlet connection through which the first coolant path extends;
  a second reservoir coolant inlet connection and a second reservoir coolant outlet connection through which the second coolant path extends;
  two fluidic first pump connections fluidically connected to the first delivery device such that lubricant is deliverable along the first lubricant path via the first delivery device;
  two fluidic second pump connections fluidically connected to the second delivery device such that lubricant is deliverable along the second lubricant path via the second delivery device;
  a plurality of reservoir lubricant outlets;
  a plurality of reservoir lubricant inlets;
  a plurality of reservoir coolant outlets; and
  a plurality of reservoir coolant inlets;
 the plurality of coolers each include:

a cooler lubricant inlet fluidically connected to an associated reservoir lubricant outlet of the plurality of reservoir lubricant outlets;

a cooler lubricant outlet fluidically connected to an associated reservoir lubricant inlet of the plurality of reservoir lubricant inlets;

a cooler coolant inlet fluidically connected to an associated reservoir coolant outlet of the plurality of reservoir coolant outlets; and a cooler coolant outlet fluidically connected to an associated reservoir coolant inlet of the plurality of reservoir coolant inlets;

the plurality of coolers are each extended through via an associated lubricant path of the plurality of lubricant paths;

coolant is flowable through each of the plurality of coolers such that, during operation, lubricant flowing along the plurality of lubricant paths is cooled with coolant in the plurality of coolers;

at least one channel is moulded in the reservoir;

at least one of (i) at least one lubricant path of the plurality of lubricant paths and (ii) at least one coolant path of the plurality of coolant paths is at least partially delimited by and extends through the at least one channel;

the first lubricant path extends through the first electric machine;

the second lubricant path extends through the second electric machine; and the third lubricant path extends through the transmission.

20. A system for a motor vehicle, comprising:

an upper reservoir part and a lower reservoir part attached to the upper reservoir part, which collectively form a reservoir;

a plurality of lubricant paths extending through the reservoir, the plurality of lubricant paths including a first lubricant path, a second lubricant path, and a third lubricant path;

a plurality of coolant paths extending through the reservoir, the plurality of coolant paths including a first coolant path and a second coolant path;

the plurality of coolant paths fluidically separated from the plurality of lubricant paths;

two separate sumps for lubricant, the two sumps moulded in the lower reservoir part;

a plurality of delivery devices attached to the reservoir, the plurality of delivery devices including a first delivery device for the first lubricant path and a second delivery device for the second lubricant path;

the reservoir including:

a first reservoir lubricant inlet connection and a first reservoir lubricant outlet connection through which the first lubricant path extends and via which the reservoir is connectable to a first component;

a second reservoir lubricant inlet connection and a second reservoir lubricant outlet connection through which the second lubricant path extends and via which the reservoir is connectable to a second component;

a third reservoir lubricant inlet connection and a third reservoir lubricant outlet connection through which the third lubricant path extends and via which the reservoir is connectable to a third component;

a first reservoir coolant inlet connection and a first reservoir coolant outlet connection through which the first coolant path extends;

a second reservoir coolant inlet connection and a second reservoir coolant outlet connection through which the second coolant path extends;

two fluidic first pump connections fluidically connected to the first delivery device such that lubricant is deliverable along the first lubricant path via the first delivery device;

two fluidic second pump connections fluidically connected to the second delivery device such that lubricant is deliverable along the second lubricant path via the second delivery device;

a plurality of reservoir lubricant outlets;

a plurality of reservoir lubricant inlets;

a plurality of reservoir coolant outlets; and a plurality of reservoir coolant inlets;

a plurality of coolers attached to the reservoir, the plurality of coolers including a first cooler for the first lubricant path, a second cooler for the second lubricant path, and a third cooler for the third lubricant path;

the plurality of coolers each including:

a cooler lubricant inlet fluidically connected to an associated reservoir lubricant outlet of the plurality of reservoir lubricant outlets;

a cooler lubricant outlet fluidically connected to an associated reservoir lubricant inlet of the plurality of reservoir lubricant inlets;

a cooler coolant inlet fluidically connected to an associated reservoir coolant outlet of the plurality of reservoir coolant outlets; and a cooler coolant outlet fluidically connected to an associated reservoir coolant inlet of the plurality of reservoir coolant inlets;

wherein the plurality of coolers are each extended through via an associated lubricant path of the plurality of lubricant paths;

wherein coolant is flowable through each of the plurality of coolers such that, during operation, lubricant flowing along the plurality of lubricant paths is cooled with coolant in the plurality of coolers;

wherein the reservoir includes at least one integral channel delimited at least partially by at least one of the upper reservoir part and the lower reservoir part; and wherein at least one of (i) at least one lubricant path of the plurality of lubricant paths and (ii) at least one coolant path of the plurality of coolant paths is delimited by and extends through the at least one channel.

* * * * *